United States Patent

Esch et al.

[11] Patent Number: 5,925,708
[45] Date of Patent: Jul. 20, 1999

[54] PRECIPITATED SILICAS

[75] Inventors: Heinz Esch, Bonn; Udo Görl, Bornheim-Roisdorf; Robert Kuhlmann, Erfstadt; Ralf Rausch, Kreuzau, all of Germany

[73] Assignee: Degussa Aktiengesellschaft, Frankfurt, Germany

[21] Appl. No.: 08/893,225

[22] Filed: Jul. 15, 1997

Related U.S. Application Data

[63] Continuation of application No. 08/713,366, Sep. 13, 1996, abandoned, which is a continuation of application No. 08/425,419, Apr. 20, 1995, abandoned, which is a division of application No. 08/319,490, Oct. 7, 1994.

[51] Int. Cl.$^6$ .................................................. C08K 3/00
[52] U.S. Cl. ................................. 524/493; 524/492
[58] Field of Search ...................... 524/492, 493

[56] References Cited

U.S. PATENT DOCUMENTS

| 3,235,331 | 2/1966 | Nauroth . | |
|---|---|---|---|
| 4,590,052 | 5/1986 | Chevallier . | |
| 4,704,425 | 11/1987 | La Garde et al. | 524/492 |
| 4,704,429 | 11/1987 | Lagarde et al. | 524/492 |
| 5,227,425 | 7/1993 | Rauline . | |
| 5,342,598 | 8/1994 | Persello . | |

*Primary Examiner*—Edward J. Cain
*Attorney, Agent, or Firm*—Pillsbury Madison & Sutro LLP

[57] ABSTRACT

A precipitated silica with the following physicochemical properties:

| BET surface area | 35 to 350 m$^2$/g |
|---|---|
| BET/CTAB surface area ratio | 0.8 to 1.1 |
| Pore volume, PV | 1.6 to 3.4 ml/g |
| Silanol group density (V2 = NaOH consumption) | 6 to 20 ml |
| Average aggregate size | 250 to 1500 nm |
| CTAB surface area | 30 to 350 m$^2$/g |
| DBP value | 150 to 300 ml/100 g |
| $V_2/V_1$ by Hg porosimetry | 0.19 to 0.46 |
| DBP/CTAB | 1.2 to 2.4. | is produced by reacting alkali silicate with mineral acids at temperatures of 60 to 95° C. while maintaining a pH of 7.5 to 10.5 and continuously stirring, continuing the reaction to a solids concentration in the precipitation suspension of 90 to 120 g/l, adjusting the pH value to a value of less than or equal to 5, filtering out, washing, drying and optionally grinding or granulating the precipitated silica. The precipitated silica is used as a filler in vulcanizable rubber compounds and vulcanizates.

7 Claims, 3 Drawing Sheets

PRECIPITATED SILICAS

This is a continuation of application Ser. No. 08/713,366, filed on Sep. 13, 1996, which was abandoned upon the filing hereof, which was a continuation of application Ser. No. 08/425,419 filed on Apr. 20, 1995, now abandoned which is a division of application Ser. No. 08/319,490, filed Oct. 7, 1994.

The present invention relates to precipitated silicas, to the process for the production thereof and to the use thereof in rubber compounds.

BACKGROUND OF THE INVENTION

Precipitated silicas may be incorporated into rubber compounds (S. Wolff, Kautschuk und Gummikunstst. 7 (1988), p. 674). Known silicas may be only very poorly dispersed in rubber compounds, particularly at high filling rates. This poor dispersibility is one of the reasons why elevated silica filling rates are used only rarely in tire compounds. One reason for poor dispersibility may lie in the process by which the precipitated silicas are produced. Drying, poor grinding or also excessively hard granulation may lead to silica particles which cannot readily be dispersed (filler flecks). These flecks may be seen with the naked eye.

Furthermore, silicas are highly polar and therefore have only poor phase compatibility with the non-polar polymers in the rubber compound. This form of dispersion occurs on the basis of the silica aggregates. It may only be evaluated using a light microscope and is known as microdispersion.

Precipitated silicas which may be used as a filler in rubber compounds for tires are known from EP-A 0 520 862.

A precipitated silica is known from published European Patent Application EP-A 0 157 703 which, according to EP-A 0 501 227, may be used as a filler in rubber compounds for tires.

Known precipitated silicas have the disadvantage that they exhibit poor microdispersion.

SUMMARY OF THE INVENTION

The object of the invention is to provide a precipitated silica with optimum phase compatibility with rubber, polymer and good microdispersion.

The present invention provides a precipitated silica characterized by the following physicochemical properties:

| | | |
|---|---|---|
| BET surface area | 35 to 350 | $m^2/g$ |
| BET/CTAB surface area ratio | 0.8 to 1.1 | |
| Pore volume, PV | 1.6 to 3.4 | ml/g |
| Silanol group density ($V_2$ = NaOH consumption) | 6 to 20 | ml |
| Average aggregate size | 250 to 1500 | nm |
| CTAB surface area | 30 to 350 | $m^2/g$ |
| DBP value | 150 to 300 | ml/100 g |
| $V_2/V_1$ by Hg porosimetry preferably | 0.19 to 0.46, 0.20 to 0.23 | |
| DBP/CTAB | 1.2 to 2.4. | |

The physicochemical properties are determined using the following measurement methods:

| | |
|---|---|
| BET surface area | Areameter, Ströhlein, to ISO 5794/Annex D |
| Pore volume | Mercury porosimetry to DIN 66 133 |
| Silanol group density | in Sears values according to G. W. Sears, Analyt. Chemistry 12, 1982–83 (1956) |
| Average aggregate size | Photon correlation spectroscopy |
| CTAB surface area | at pH 9 according to Jay, Janzen and Kraus in Rubber Chemistry and Technology 44 (1971), 1287 |
| DBP value | ASTM D 2414-88 |
| Hg porosimetry | DIN 66 133 |

The precipitated silica according to the invention may in particular have the following physicochemical parameters:

| BET surface area ($m^2/g$) | Hg porosimetry (ml/g) | Sears value $V_2$ NaOH (ml) | Average aggregate size (nm) |
|---|---|---|---|
| 35–100 | 2.5–3.4 | 6–12 | 900–1500 |
| 100–150 | 2.4–3.2 | 8–15 | 400–850 |
| 150–200 | 1.6–2.4 | 11–19 | 300–550 |
| 200–350 | 1.6–2.3 | 12–20 | 250–520 |

In a preferred embodiment, the precipitated silica according to the invention has good grindability. This characteristic is represented by the average particle size determined using Malvern laser diffraction (D(4.3)) of $\leq 11$ μm, in particular of $\leq 10$ μm, measured after grinding on an Alpine Kolloplex pin impact mill (Z 160) at a throughput of 6 kg/h.

The present invention also provides a process for the production of the precipitated silica with the following physicochemical parameters

| | | |
|---|---|---|
| BET surface area | 35 to 350 | $m^2/g$ |
| BET/CTAB surface area ratio | 0.8 to 1.1 | |
| Pore volume, PV | 1.6 to 3.4 | ml/g |
| Silanol group density (V2 = NaOH consumption) | 6 to 20 | ml |
| Average aggregate size | 250 to 1500 | nm |
| CTAB surface area | 30 to 350 | $m^2/g$ |
| DBP value | 150 to 300 | ml/100 g |
| $V_2/V_1$ by Hg porosimetry preferably | 0.19 to 0.46, 0.20 to 0.23 | |
| DBP/CTAB | 1.2 to 2.4 | | which is characterized in that alkali silicate is reacted with mineral acids at temperatures of 60 to 95° C. while maintaining a pH of 7.5 to 10.5 and continuously stirring, the reaction is continued to a solids concentration in the precipitation suspension of 90 to 120 g/l, the pH value is adjusted to a value of less than or equal to 5, the precipitated silica filtered out, washed, dried and optionally ground or granulated.

In a preferred embodiment, customary commercial sodium water glass may be diluted with water to a pH of 8 to 9 and concentrated sulfuric acid and the same water glass solution may simultaneously be added to this diluted water glass solution which has an $SiO_2$ content of 4.9 g/l, while maintaining the pH value of 8 to 9.

Simultaneous addition of water glass solution and sulfuric acid may be performed over a period (duration of precipitation) of up to 160 minutes, preferably of greater than 90 minutes, in particular within 30 to 90 minutes.

Depending upon the duration of precipitation, differing BET surface areas of the precipitated silica may be achieved. Thus, at a duration of precipitation of more than 90 minutes, surface areas of 35 to 150 $m^2/g$ are achieved and, at a duration of 30 to 90 minutes, surface areas of 150 to 350 $m^2/g$.

The precipitated silica according to the invention may be modified with organosilanes of the formulas I to III

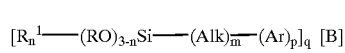

(I)

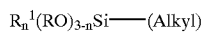

(II)

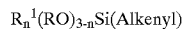

(III)

in which

B: means —SCN, —SH, —Cl, —NH$_2$ (if q=1) or —S$_x$— (if q=2),

R and R$^1$: mean an alkyl group with 1 to 4 carbon atoms, the phenyl residue, wherein all residues R and R$^1$ may each have the same or different meaning, R: means a C$_1$–C$_4$ alkyl, —C$_1$–C$_4$ alkoxy group, n: means 0, 1 or 2, Alk: means a divalent unbranched or branched hydrocarbon residue with 1 to 6 carbon atoms, m: means 0 or 1, Ar: means an arylene residue with 6 to 12 carbon atoms, preferably 6 carbon atoms, p: means 0 or 1, providing that p and n do not simultaneously mean 0, x: means a number from 2 to 8, Alkyl: means a monovalent unbranched or branched unsaturated hydrocarbon residue with 1 to 20 carbon atoms, preferably 2 to 8 carbon atoms, Alkenyl: means a monovalent unbranched or branched unsaturated hydrocarbon residue with 2 to 20 carbon atoms, preferably 2 to 8 carbon atoms.

Modification with organosilanes may be performed in mixtures of 0.5 to 50 parts of organosilanes, related to 100 parts of precipitated silica, in particular of 2 to 15 parts; related to 100 parts of precipitated silica, wherein the reaction between the precipitated silica and silane may be performed during compounding (in situ) or outside the compounding process (premodified).

In a preferred embodiment of the invention, Bis- (3-[triethoxy-silyl]-propyl)-tetrasulfane may be used as the silane.

The precipitated silica according to the invention may be incorporated into vulcanizable rubber compounds as a reinforcing filler in quantities of 5 to 200 parts, related to 100 parts of rubber, as a powder, microbeads or granules both with and without silane modification.

One or more of the above-stated silanes may be added, together with the silica according to the invention, to the rubber compound, wherein the reaction between the filler and silane proceeds during the compounding process at elevated temperatures (in situ modification), or in already premodified form (see, for example, German patent DE 40 04 781), i.e. the two reactants are reacted outside the actual compounding process.

In addition to compounds exclusively containing the silicas according to the invention with and without organosilanes according to formulae I to III, the rubber compounds may additionally be reinforced with one or more fillers having a greater or lesser reinforcing action. It would primarily be customary in this connection to use a blend of carbon blacks (for example furnace, gas, flame, acetylene blacks) and the silicas according to the invention, with or without silane, but also of natural fillers, such as for example clays, siliceous chalks, other commercial silicas and the silicas according to the invention.

The blending ratio, as with the quantity of organosilane added, depends in this connection on the range of properties to be achieved in the finished rubber compound. A ratio of 5–95% between the silicas according to the invention and the other above-stated fillers, i.e., the silica according to the invention is 5–95% by weight of the mixture of fillers, is conceivable and is also achieved in this context.

Apart from the silicas according to the invention, the organosilanes and other fillers, the elastomers comprise a further important constituent of the rubber blend. The silicas according to the invention may be used in any types of rubber which may be vulcanized with accelerators/sulphur or also peroxide curable rubbers. Rubbers which may be cited in this connection are natural or synthetic elastomers, oil-extended or not, as a single polymer or blend with other rubbers such as for example natural rubbers, butadiene rubbers, isoprene rubbers, butadiene/styrene rubbers, in particular SBR produced using the solution polymerization process, butadiene/acrylonitrile rubbers, butyl rubbers, terpolymers of ethylene, propylene and unconjugated dienes.

The following additional rubbers may moreover also be considered for use in rubber compounds with the stated rubbers:

carboxyl rubbers, epoxy rubbers, transpolypentenamers, halogenated butyl rubbers, 2-chlorobutadiene rubbers, ethylene/vinyl acetate copolymers, ethylene/propylene copolymers, optionally together with chemical derivatives of natural rubber and modified natural rubbers.

Customary further constituents such as plasticizers, stabilizers, activators, pigments, antioxidants and processing auxiliaries in customary quantities are also known.

The silicas according to the invention, with and without silane, may be used in any rubber applications, such as for example tires, conveyor belts, seals, V-belts, tubes, shoe soles etc.

Dispersion, i.e. the distribution of a substance (filler) in a polymer compound, is of vital significance to the subsequent properties of the article containing this substance. Tear strength values in particular (tensile strength, elongation at break, tear propagation resistance), but also hysteresis and abrasion values are highly dependent upon dispersion (C. W. Schweitzer, W. M. Hess, J. E. Callun, Rubber World, 138, No. 6, 809 (1958) and 139, No. 1, 74 (1958)), (W. M. Hess, F. P. Ford, Rubber Chem. Tech., 36, No. 5, 1191 (1963)).

The significance of this parameter to rubber properties is accompanied by a lack of options for exactly measuring it, or many of the most commonly used methods allow only a subjective examination and assessment of dispersion.

The most widely used methods for measuring dispersion are described in ASTM D 2663-88 and were all developed to measure the dispersion of carbon black in rubber, but may however also be used to measure the dispersion of silica-filled compounds, provided that the compound contains only this filler and not blends, for example carbon black and silica.

One of the three methods described in the above-mentioned standard involves visual examination with the naked eye or slight magnification under the microscope and photographic recording of the vulcanizate samples, wherein the result is assessed against 5 standard photographs using a numbered scale from 1 to 5.

Another method is to count filler agglomerates with a size of ≦5, μm. To this end, a microtome section of the vulcanizate is prepared and the percentage of the area occupied by these agglomerates is determined by transmission light microscopy. Here too, dispersion is divided into classes.

The third option described is scanning the surface roughness of the vulcanizate with a needle. In this manner, the number and average height of surface roughness is measured. As with method 2, the roughness factor is converted into a dispersion index from very good to very poor.

The microscopic method (for example 30 times magnification), in which dispersion in the vulcanizate is assessed against a numbered scale from 1 to 10 using 10 standard photographs is presently the most commonly used method, which, although subjective, is rapid, meaningful and most suited to laboratory operation.

Dispersion and its evaluation described above constitute a property of the silica in the polymer compound. In order to be able to predict the subsequent dispersion behavior of a silica in the polymer compound before it is compounded, for example with rubber, the person skilled in the art makes use of the grindability of the silica. In other words, the grindability of the silica and its subsequent dispersion, for example in rubber, largely correlate.

This grindability may inter alia be characterized by the energy required to achieve a particular particle fineness, or conversely by the particle fineness achieved when a grinder is operated at the same power and product throughput. The mill used is an Alpine-Kolloplex pin impact mill (z 160) operated at a constant product throughput of 6 kg/h.

Particle fineness is characterized by the average, volume-weighted particle diameter MTG (D(4.3)) measured by laser diffraction (Malvern Instruments, model 2600 c).

Values of $\leq 11$ $\mu$m, in particular of $\leq 10$ $\mu$m, are achieved for the silicas according to the invention, which are higher in customary silicas ($\geq 12$ $\mu$m). it has also been found that due to the process by which the silicas are produced the silicas according to the invention are already so fine that in contrast with conventional products they require no further grinding for many industrial applications and thus also offer economic advantages.

The present invention also provides vulcanizable rubber compounds which contain the precipitated silicas according to the invention in quantities of 5 to 200 parts, related to 100 parts of rubber. Incorporation of this silica and production of the compounds containing this silica proceed in the manner customary in the rubber industry in an internal mixer or roll mill. The silica may be presented or used as powder, microbeads or granules. In this respect too, the silicas according to the invention do not differ from known, light silicate fillers.

Due to the above-stated differences, the precipitated silicas according to the invention lead to improved dispersion properties at a constant surface area compared with standard silicas.

The silicas according to the invention also exhibit better properties in relation to some other technically important rubber parameters. The following properties may be mentioned, higher modulus, lower tan $\delta$ as a measure of tire rolling resistance, better abrasion resistance, lower T-center values, better wet skid resistance, better rebound resilience, better heat build-up performance and better viscosity.

DETAILED DESCRIPTION OF PREFERRED EMBODIMENTS

Figure 1:
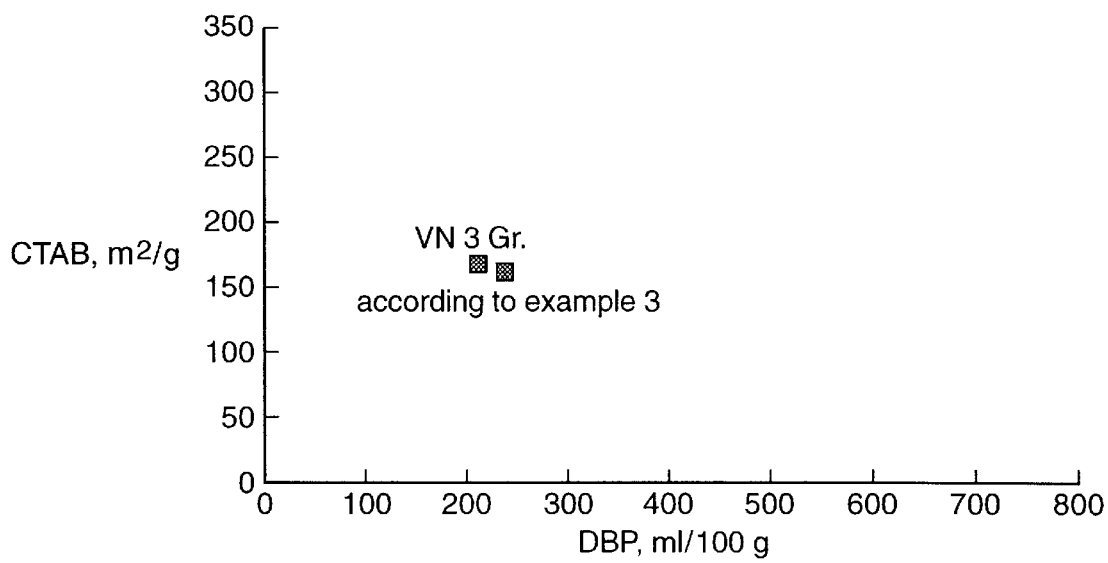

The following examples illustrate the invention:
The following substances are used in the examples:
First Latex Crepe—natural rubber
Ultrasil VN 2—precipitated silica (Degussa AG) with an $N_2$ surface area of 125 $m^2/g$
Ultrasil VN 3—precipitated silica (Degussa AG) with an $N_2$ surface area of 175 $m^2/g$
CBS—benzothiazyl-2-cyclohexylsulphenamide
TMTM—tetramethylthiuram monosulphide
Si 69—bis(3-triethoxysilylpropyl)—tetrasulfane (Degussa AG)
DEG—diethylene glycol
VSL 1955 S 25—solution polymerized styrene/butadiene rubber with a styrene content of 25% and a vinyl content of 55% (Bayer AG)
DPG—diphenylguanidine
Vulkanox 4020—N—(1,3-dimethylbutyl)—N-phenyl-p-phenylenediamine (Bayer AG)
Protector G 35—ozone protective wax
ZBED—zinc dibenzylthiocarbamate
Buna CB 24—butadiene rubber from Bunawerke Hüls
Naftolene ZD—aromatic mineral oil plasticizer
Hisil210—silica from PPG with an $N_2$ surface area of approx. 130 $m^2/g$
Hisil 255—silica from PPG with an $N_2$ surface area of approx. 170 $m^2/g$
KS 300—silica from Akzo with an $N_2$ surface area of approx. 125 $m^2/g$
KS 404—silica from Akzo with an $N_2$ surface area of approx. 175 $m^2/g$
The following test standards were used:

| Test | Unit | Standard |
|---|---|---|
| Tensile stress | MPa | DIN 53 504 |
| Compression set B | % | ASTM D 395 |
| Loss angle tan $\delta$ | - | DIN 53 513 |
| DIN abrasion | $mm^3$ | DIN 53 516 |
| Firestone ball rebound | % | AD 20 405 |
| Mooney viscosity | ME | DIN 53 523/524 |
| Goodrich flexometer | | ASTM D 623 A |

EXAMPLE 1

Production of a silica according to the invention with an $N_2$ surface area in the range 100 $m^2/g$ 43.5 $m^3$ of hot water is introduced into a vat and customary commercial sodium waterglass (weight modulus 3.42, density 1.348) is stirred in in a quantity such that a pH of 8.5 is achieved. While maintaining a precipitation temperature of 88° C. and pH 8.5, 16,8 $m^3$ of the same water glass and sulfuric acid (96%) are simultaneously added within 150 minutes from opposite positions. A solids content of 100 g/l is produced. Further sulfuric acid is then added until a pH of <5 is achieved. The solids are separated in presses, washed and the pressed paste dried by spray drying or in a rotary kiln and optionally ground.

The precipitated silica obtained has an $N_2$ surface area of 80 $m^2/g$, an aggregate size of 1320 nm and grindability of 10 $\mu$m. The Sears value ($V_2$) is 9.0 ml and Hg porosimetry 2.7 ml/g. The CTAB surface area is 75 $m^2/g$. The DBP value is 236 ml/100 g. The $V_2/V_1$ ratio is 0.327. The DBP/CTAB ratio is 3.5.

EXAMPLE 2

Production of a silica according to the invention with an $N_2$ surface area of the 100–150 $m^2/g$ range The same procedure is used as in Example 1, with the exception that a pH value of 9.0 is maintained in the initial precipitation batch and during precipitation. After 135 minutes, a solids content of 98 g/l is achieved in the precipitation suspension.

The precipitated silica obtained has an $N_2$ surface area of 120 $m^2/g$, grindability of 8.8 $\mu$m, a Sears value of 9.1 ml at an aggregate size of 490 nm and an Hg pore volume of 2.85 ml/g. The DBP value is 270 ml/100 g. The CTAB surface area is 115 m²/g. The $V_2/V_1$ ratio is 0.27. The DBP/CTAB ratio is 2.34.

EXAMPLE 3

Production of a silica according to the invention with an $N_2$ surface area in the 150–200 m²/g range The same procedure is used as in Example 2, with the difference that the precipitation time is shortened to 76 minutes and the precipitation temperature reduced to 80° C. After this period, a solids content in the precipitation suspension of 100 g/l is achieved. The precipitated silica obtained has the following physicochemical parameters:

| | |
|---|---|
| BET surface area | 184 m²/g |
| grindability of | 8.7 μm |
| Sears value | 15.7 ml | at an aggregate size of 381 nm, Hg pore volume 2.26 ml/g. The CTAB surface area is 165 m²/g. The DBP value is 255 ml/100 g. The $V_2/V_1$ ratio is 0.2080 to 0.2299. The DBP/CTAB ratio is 1.545.

EXAMPLE 4

Determination of pore volume by Hg porosimetry on silicas according to the invention compared with some presently known commercial standard silicas

| Process:Hg - Porosimetry according to DIN 66 133 injection process 7-500 bar | | |
|---|---|---|
| Product Name | $N_2$ surface area (m²/g) | Pore Volume (ml/g) |
| $N_2$ surface area (m²/g): 100–150 | | |
| Hisil 210 | 130 | 1.54 |
| KS 300 | 125 | 1.98 |
| Ultrasil VN 2 | 125 | 1.82 |
| Silica according to the invention (Example 2) | 120 | 2.85 |
| $N_2$ surface area (m²/g): 150–200 | | |
| Hisil 255 | 170 | 1.13 |
| KS 404 | 175 | 1.66 |
| Ultrasil VN 3 | 175 | 1.46 |
| Silica according to the invention (example 3) | 184 | 2.26 |

The silicas according to the invention have a distinctly higher pore volume.

EXAMPLE 5

Comparison of Sears value ($V_2$) as a measure of the OH group density of the silicas according to the invention with standard commercial silicas

| Product name | $N_2$ surface area (m²/g) | $V_2$ (ml) = NaOH consumption (ml/g) |
|---|---|---|
| $N_2$ surface area (m²/g): 100–150 | | |
| Hisil 210 | 130 | 16.8 |
| KS 300 | 125 | 16.1 |
| Ultrasil VN 2 | 125 | 15 |
| Silica according to the invention (Example 2) | 120 | 9.1 |
| $N_2$ surface area (m²/g): 150–200 | | |
| Hisil 255 | 170 | 16.9 |
| KS 404 | 175 | 16.9 |
| Ultrasil VN 3 | 175 | 20.7 |
| Silica according to the invention (example 3) | 184 | 15.7 |

The lower $V_2$=NaOH consumption, the lower is the OH group density. The comparison shows that the silicas according to the invention may have a silanol group density of up to 40% lower than known precipitated silicas.

EXAMPLE 6

Determination of average aggregate size by photon correlation spectroscopy

Parameters:

Ultrasound time: 15'

Suspending agent: Isopropanol/pentanol 10:1

Weight: 30 mg silica per 10 ml suspending agent

| Product name | $N_2$ surface area (m²/g) | Average aggregate size (nm) |
|---|---|---|
| $N_2$ surface area (m²/g): 100–150 | | |
| Hisil 210 | 130 | 254 |
| KS 300 | 125 | 197 |
| Ultrasil VN 2 | 125 | 191 |
| Silica according to the invention (example 2) | 120 | 490 |
| $N_2$ surface area (m²/g): 150–200 | | |
| Hisil 255 | 170 | 152 |
| KS 404 | 175 | 218 |
| Ultrasil VN 3 | 175 | 167 |
| Silica according to the invention (example 3) | 184 | 381 |

The average aggregate size of the silicas according to the invention is distinctly greater than that of the known precipitated silicas.

EXAMPLE 7

Silica according to Example 2 of the invention in comparison with Ultrasil VN 2 in a natural rubber formulation with Si 69

| | 1 | 2 |
|---|---|---|
| First Latex Crepe | 100 | 100 |
| Ultrasil VN 2 | 50 | — |
| Silica according to Example 2 of the invention | — | 50 |
| ZnO RS | 4 | 4 |
| Stearic acid | 2 | 2 |
| DEG | 1 | 1 |
| Si 69 | 3.2 | 3.2 |
| CBS | 1.6 | 1.6 |
| TMTM | 0.3 | 0.3 |
| Sulfur | 0.8 | 0.8 |
| Mooney viscosity (MU) | 77 | 69 |

-continued

|  | 1 | 2 |
|---|---|---|
| Vulcanizate data: 150° C./$t_{95\%}$ | | |
| 300% modulus (MPa) | 8.1 | 9 |
| Ball rebound (%) | 56.8 | 58.6 |
| DIN abrasion (mm3) | 125 | 114 |
| Goodrich flexometer (0.175", 108 N, RT, 18 h) | | |
| T-center (° C.) | 81.2 | 70.8 |
| MTS (DIN 53 513) tan δ/60° C. | | |

In comparison with Ultrasil VN 2, which is comparable in surface area, the silica according to Example 2 of the invention leads to lower viscosities, higher modulus and resilience values, improved abrasion, lower heat build-up and lower loss angle tan at 60° C. and thus lower rolling resistance.

EXAMPLE 8

Silica according to the invention (Example 3) in comparison with Ultrasil VN 3 in a solution-SBR/BR tire tread formulation with Si 69

|  | 1 | 2 |
|---|---|---|
| VSL 1955 S 25 | 96 | 96 |
| Buna CB 24 | 30 | 30 |
| Ultrasil VN 3 | 80 | — |
| Silica according to the invention (example 3) | — | 80 |
| ZnO RS | 3 | 3 |
| Stearic acid | 2 | 2 |
| Naftolen ZD | 10 | 10 |
| Vulkanox 4020 | 1.5 | 1.5 |
| Protektor G 35 | 1 | 1 |
| Si 69 | 6.4 | 6.4 |
| CBS | 1.5 | 1.5 |
| DPG | 2 | 2 |
| ZBED | 0.2 | 0.2 |
| Sulfur | 1.5 | 1.5 |
| Mooney viscosity (MU) | 72 | 68 |
| Vulcanizate data: 150° C./t95% | | |
| 300% modulus (MPa) | 8.9 | 9.3 |
| Ball rebound (%) | 52.6 | 54.7 |
| MTS (DIN 53 513) | | |
| tan δ 0° C. | 0.480 | 0.501 |
| tan δ 0° C. | 0.152 | 0.144 |

In comparison with VN 3, the silica according to the invention has lower viscosity, higher modulus, higher elasticity and, particularly importantly, higher wet skid resistance with low rolling resistance.

EXAMPLE 9

Comparison of dispersion of silica according to the invention (Example 2) compared with VN 2 (identical $N_2$ surface area of approx. 120 m²/g) (using the Philipps methods, described in technical information brochure 102 A).

A piece of rubber approximately 20–30 μm in thickness (area approx. 5×5 mm) is cut using a Vibracut apparatus from FTB-Feinwerktechnik from a 6 mm sheet of vulcanizate of the formulation according to example 8 filled with 80 parts of Ultrasil VN 2 or of the silica according to the invention from Example 2, related to 100 parts of rubber. This sample of rubber is transferred onto a glass slide and covered with a second glass slide. The sample prepared in this manner is examined under a light microscope with a reflected light attachment and reproduced as a negative image with 55-times magnification. A positive image with the desired final magnification is prepared from this negative.

Dispersion is assessed according to the Philipps method using 10 standard photographs as stated below:

| Number | Dispersion |
|---|---|
| 1–2 | very poor |
| 3–4 | poor |
| 5–6 | adequate |
| 7–8 | good |
| 9–10 | very good |

The dispersion of Ultrasil VN 2 is rated at 5 and is thus adequate, the dispersion of the silica according to the invention from Example 2 is rated at 9 and is thus very good.

EXAMPLE 10

Comparison of dispersion of silica according to the invention from Example 3 with Ultrasil VN 3 (identical $N_2$ surface area of approx. 175 m²/g) Formulation, procedure and assessment are performed in a similar manner to Example 9.

The dispersion of Ultrasil VN 3 is rated at 2 and is thus very poor, the dispersion of the silica according to Example 3 of the invention is rated at 8 and is thus good.

EXAMPLE 11

Determination of dispersion by roughness measurement using a Federal Dispersion Analysis EM D-4000-W7 unit. Comparison of Ultrasil VN 2 with the silica according to the invention from Example 2.

A piece of rubber (20×2 mm) is cut using a cutting device also supplied by the above-stated equipment manufacturer from a 2 mm sheet of vulcanizate of the formulation according to Example 8 filled with 80 parts of Ultrasil VN 2 or with the silica according to the invention from Example 2, related to 100 parts of rubber, and is fixed into a holder provided by the equipment manufacturer. The surface of the vulcanizate is scanned using a diamond needle and the surface roughness caused by dispersion so determined. This process allows dispersion to be quantified as the device determines a value $F^2H$. F means the number of peaks and H their average height. Thus, the lower the value of this parameter, the better is the dispersion of the filler in the vulcanizate sample. For the above-stated fillers, the parameter $F^2H$ gave the following values:

|  | Ultrasil VN 2 | Silica according to the invention (example 2) |
|---|---|---|
| $F^2H$ | 82366 | 32556 |

The silica according to the invention thus has distinctly better dispersion. This method thus confirms the results from Example 9.

EXAMPLE 12

Comparison of dispersion of Ultrasil VN 3 with the silica according to the invention from Example 3 using the roughness measurement from Example 11. The filling rate and procedure are here similar to those in Example 11.

|  | Ultrasil VN 3 | Silica according to the invention (example 3) |
|---|---|---|
| $F^2H$ | 55601 | 22602 |

The silica according to the invention has distinctly better dispersion characteristics than VN 3. This method confirms the results found in Example 10.

BRIEF DESCRIPTION OF FIGURES OF DRAWING

The drawings compare the essential physicochemical parameters of the precipitated silica according to the invention with those of known precipitated silica. The drawings show:

FIG. 1 the ratio of CTB to DBP

Figure 2:
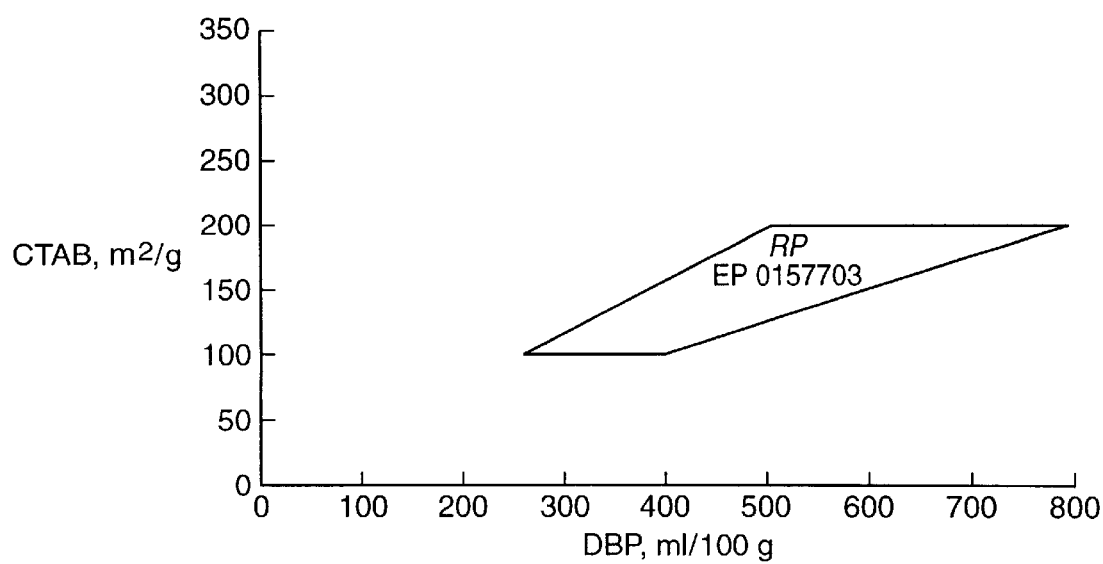
Figure 3:
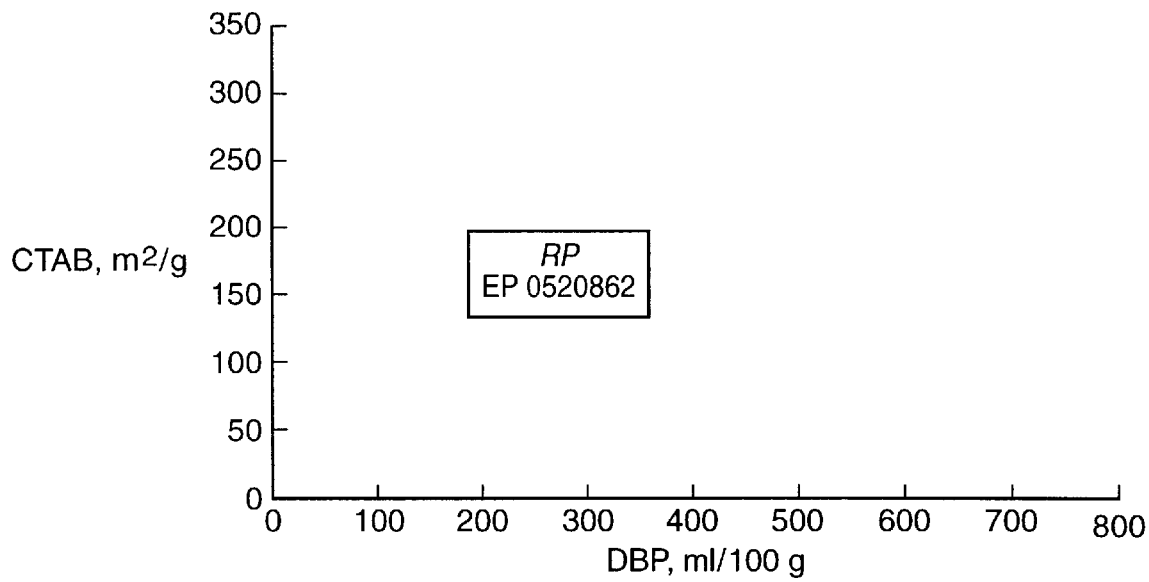
Figure 4:
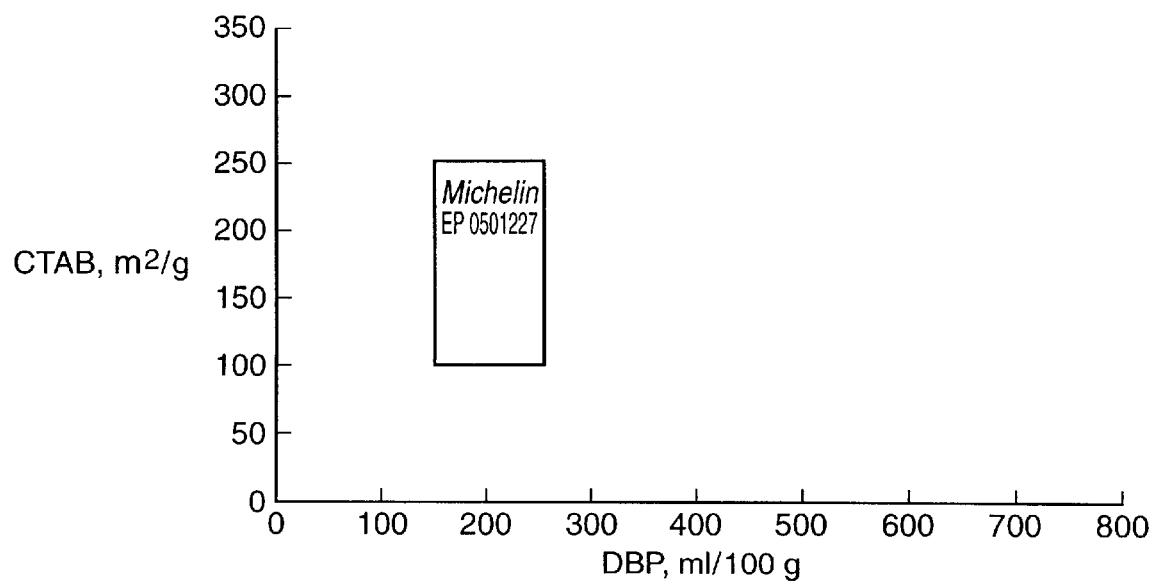

FIGS. 2 to 4 the ratio of CTAB to DBP

Figure 5:
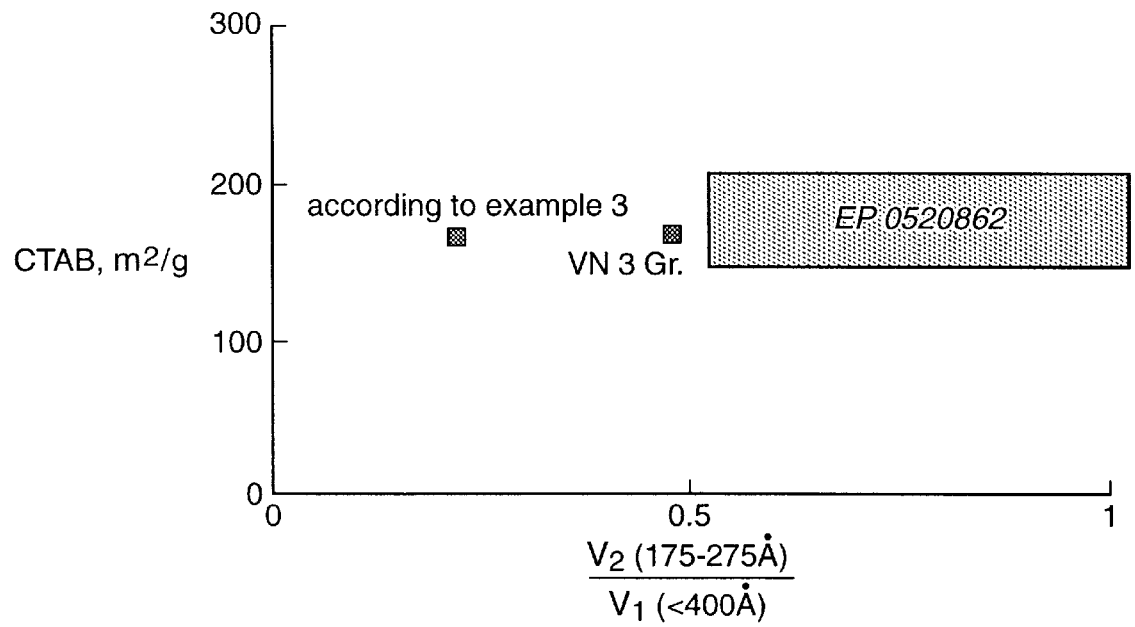

FIG. 5 the ratio of CTAB to V2/V1

Figure 6:
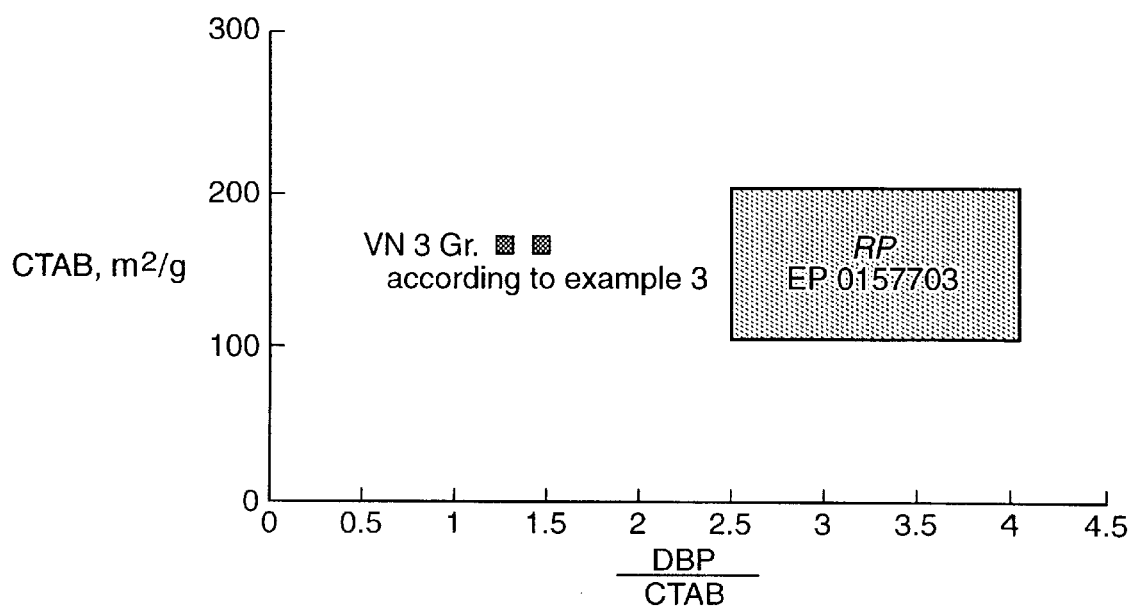

FIG. 6 the ratio of CTAB to DBP/CTAB.

What is claimed is:

1. A vulcanizable rubber compound suitable for use in tires comprising a vulcanizable rubber and a precipitated silica having the following physico chemical properties:

| BET surface area | 35 to 350 m$^2$/g |
|---|---|
| BET/CTAB surface area ratio | 0.8 to 1.1 |
| Pore volume | 1.6 to 3.4 ml/g |
| Silanol group density (ml = NaOH consumption) | 6 to 20 ml |
| Average aggregate size | 250 to 1500 nm |
| CTAB surface area | 30 to 350 m$^2$/g |
| DBP value | 150 to 300 ml/100 g |
| $V_2/V_1$ by Hg porosimetry | 0.19 to 0.46 |
| DBP/CTAB | 1.2 to 2.4. |

2. A vulcanizate comprising a vulcanized suitable for use in tires rubber and a precipitated silica having the following physico chemical properties:

| BET surface area | 35 to 350 m$^2$/g |
|---|---|
| BET/CTAB surface area ratio | 0.8 to 1.1 |
| Pore volume | 1.6 to 3.4 ml/g |
| Silanol group density (ml = NaOH consumption) | 6 to 20 ml |
| Average aggregate size | 250 to 1500 nm |
| CTAB surface area | 30 to 350 m$^2$/g |
| DBP value | 150 to 300 ml/100 g |
| $V_2/V_1$ by Hg porosimetry | 0.19 to 0.46 |
| DBP/CTAB | 1.2 to 2.4. |

3. The vulcanizable rubber compound according to claim 1 wherein the precipitated silica has an average particle fineness ≦11 μm.

4. The vulcanizable rubber compound according to claim 3, wherein the precipitated silica has an average particle fineness ≦10 μm.

5. The vulcanizate according to claim 2 wherein the precipitated silica has an average particle fineness ≦11 μm.

6. The vulcanizate according to claim 5, wherein the precipitated silica has an average particle fineness ≦10 μm.

7. The vulcanizate according to claim 2 wherein the vulcanizate has a $F^2H$ value between 32556 and 22602.

\* \* \* \* \*